INVENTOR:
BJARNE STORSAND

United States Patent Office 3,059,171
Patented Oct. 16, 1962

3,059,171
ABSORPTION CHOKE COIL, ESPECIALLY FOR USE IN HIGH CURRENT-INTENSITY RECTIFIER PLANTS
Bjarne Storsand, Watt, Switzerland, assignor to Oerlikon Engineering Company, Zurich, Switzerland, a corporation of Switzerland
Filed June 5, 1959, Ser. No. 818,401
Claims priority, application Switzerland June 6, 1958
2 Claims. (Cl. 323—61)

In the case of high current-intensity rectifier plants it is known to use so-called multiphase push-pull arrangements. Particularly in the case of three-phase push-pull arrangements use is made of absorption chokes coils in zig-zag connection. As is known, these choking coils have for their duty to absorb the higher harmonics.

Figure 1:
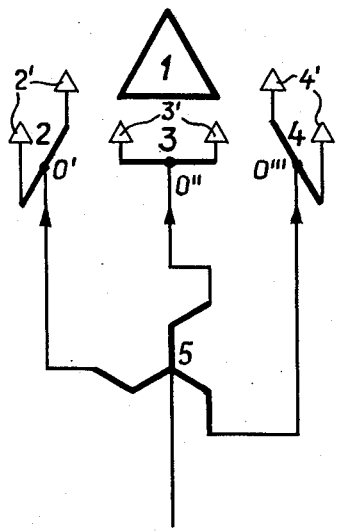

FIG. 1 shows diagrammatically such a three-phase choking coil arrangement.

Figure 2:
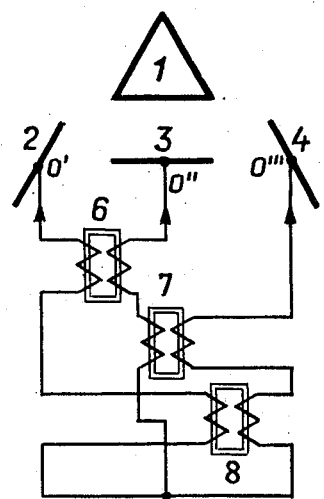

Therein, numeral 1 designates the primary winding of the transformer; 2, 3 and 4 the secondary windings, at whose zero points 0', 0", 0''' the absorption choke coil 5 is connected in zig-zag arrangement. 2', 3', 4' are the rectifiers. FIG. 2 shows a conventional design of this absorption choke coil. Like reference numerals indicate like parts in the figures of the drawing. 6, 7, 8 designate closed cores having arranged thereon the various windings of the three-phase choke coil arrangement. An essential drawback of this conventional arrangement, however, is seen in the great expediture of material for the absorption choke coils. The losses arising therein essentially affect the efficiency of the rectifier plants. Especially at low voltages, a lowering of the voltage drop below 1–2 volts in the usual absorption choke coil arrangement is connected with appreciable difficulties and great expenditure in material (large cross-sections of the conductors).

In order to create an arrangement free from the aforementioned drawbacks, according to the invention a absorption choke coil arrangement is chosen, comprising at least three rod-type choke coils which include a tubular lamellar iron core, having arranged therein at least two insulated straight conductors through which the direct current of two different transformer zero points flows in opposite directions. The advantage of the invention consists in that the direct current voltage drop and thus the losses of the absorption choke coil arrangement are substantially diminished in a simple manner. Further, since 90 percent by weight of the absorption choke coil consists of iron, the arrangement according to the invention is highly advantageous also in respect of expenditure in material.

According to other features of the invention, the length of the iron core, for every 100 volts of direct current voltage, amounts to between 50 and 100 cm.

According to a preferred form of embodiment of the invention, at about 500 volts the length of the iron core is chosen as 50 to 100 times its internal diameter.

It is preferable to allow the cooling medium to flow through at least one of the two tubularly shaped internal conductors.

Moreover, it is of advantage to have the absorption choke coil arrangement in zig-zag connection made up of three parallelly arranged iron cores with short end connections of the internal conductors.

Figure 4:
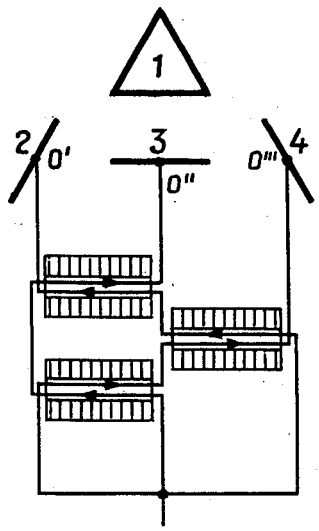
Figure 3:
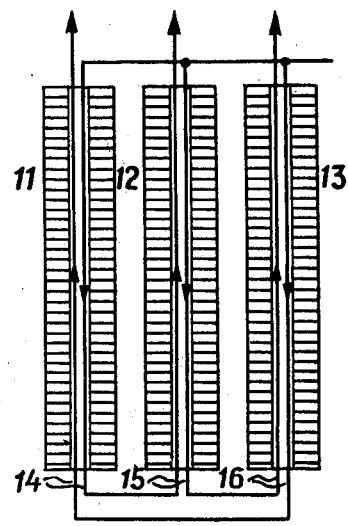

FIGS. 3 and 4 illustrate forms of embodiment diagrammatically. FIG. 3 shows the three-phase absorption choke coil. 11, 12 and 13 designate the diagrammatically illustrated hollow iron packets of the three-phase absorption choke coils, 14, 15, 16 the straight conductors which are separated from each other and through which the current flows in opposite directions. These conductors, shown by a single line, are in reality formed as concentric copper tubes. FIG. 4 shows a possible arrangement of the choke in the triple single-phase push-pull arrangement.

In operation, the rectifiers 2', 3', and 4' produce full wave rectification of the alternating current induced in the secondary windings 2, 3, and 4 of the transformer. The current flowing in the windings 3 lags that in the windings 2 by 60°, and the current in the windings 4 lags that in the windings 3 by 60°. If these waves are superimposed, therefore, they produce a direct current wave having a relatively small amplitude of oscillation. The higher harmonics in this wave are absorbed as the currents in the conductors 19, 20, and 21 (see FIGURE 4) flow through the choke coils including the cores 11, 12, and 13. A direct current voltage drop is in this manner produced between the lines 22, and 23 of the secondary circuit.

What I claim is:
1. An absorption choke coil arrangement for a three phase rectifier circuit including a transformer, comprising three rod-type choke coils each consisting of a tubular lamellated iron core having a single axial opening therein, and two straight conductors extending through the opening in each of said cores and insulated from each other, each of said conductors being connected in series with another one of said conductors extending through a core other than the one through which the first of said conductors extends, each pair of said series-connected conductors being connected respectively to the zero points of the three windings of said transformer secondary, and said conductors being so arranged that the direct current from these zero points flows in opposite directions through the two conductors within each of said cores.
2. An absorption choke coil arrangement according to claim 1 wherein said conductors are concentrically arranged tubular members.

References Cited in the file of this patent
UNITED STATES PATENTS

| | | |
|---|---|---|
| 2,806,117 | Koontz et al. | Sept. 10, 1957 |
| 2,891,212 | Bingham | June 16, 1959 |
| 2,945,961 | Healis | July 19, 1960 |
| 2,958,817 | Kaiser et al. | Nov. 1, 1960 |

OTHER REFERENCES

"Balancing Reactors for Semiconductors Rectifiers," Electrical Engineering, July 1958, vol. 77, p. 589.